March 16, 1926.

S. J. LOVERN ET AL 1,577,332

COUPLING

Filed Jan. 29, 1924  2 Sheets-Sheet 1

Inventor
S. J. Lovern
H. J. Wellman
By Victor J. Evans
Attorney

March 16, 1926.  
S. J. LOVERN ET AL  
COUPLING  
Filed Jan. 29, 1924  
1,577,332  
2 Sheets-Sheet 2

Inventor  
S. J. Lovern  
H. J. Wellman  
By Victor J. Evans  
Attorney

Patented Mar. 16, 1926.

1,577,332

UNITED STATES PATENT OFFICE.

SAMUEL J. LOVERN AND HENRY J. WELLMAN, OF NOLAN, WEST VIRGINIA.

COUPLING.

Application filed January 29, 1924. Serial No. 689,318.

*To all whom it may concern:*

Be it known that we, SAMUEL J. LOVERN and HENRY J. WELLMAN, citizens of the United States, residing at Nolan, in the county of Mingo and State of West Virginia, have invented new and useful Improvements in Couplings, of which the following is a specification.

Our present invention has reference to a coupling for the air brakes of railway stock.

The object of the invention is to provide the pipe ends of the coupling heads with valves spring influenced to normally close the passage therethrough and having outer handle portions in the path of engagement with the horns of the cooperating coupler heads to open the valves when the couplers are associated and to permit of the escape of air to bring the cars to a regular stop without the jamming of the brakes and the damage to the rolling stock resulting from such sudden jerks and stops when the draw heads are pulled or the couplings disconnected.

With the above broadly stated object in view and others which will present themselves as the nature of the invention is better understood, reference is to be had to the drawings which accompany and which form part of this application, and in which:—

Figure 1:
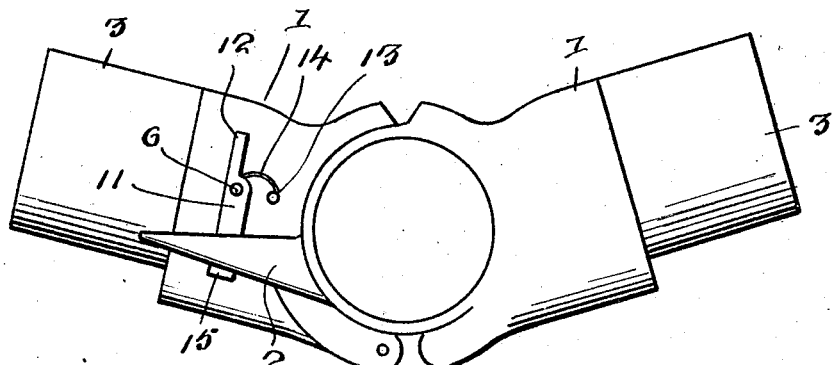
Figure 1 is a side elevation of two air pipe coupling heads connected in accordance with this invention.
Figure 2:
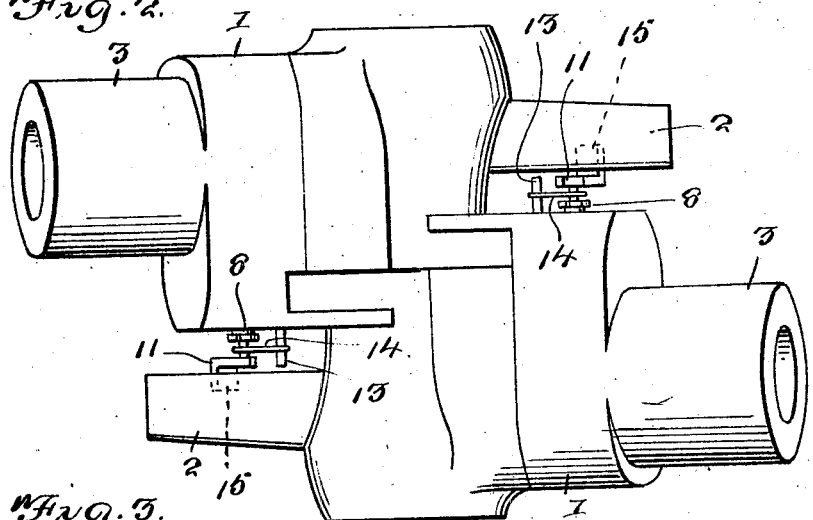
Figure 2 is a top plan view thereof.
Figure 3:
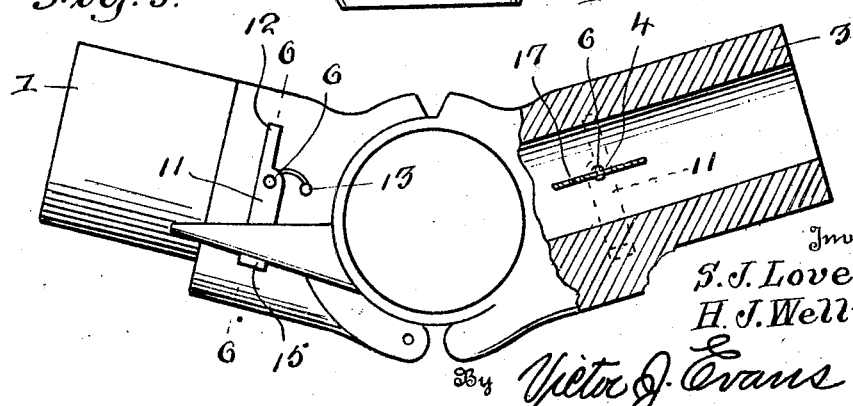
Figure 3 is a side elevation partly in section.
Figure 4:
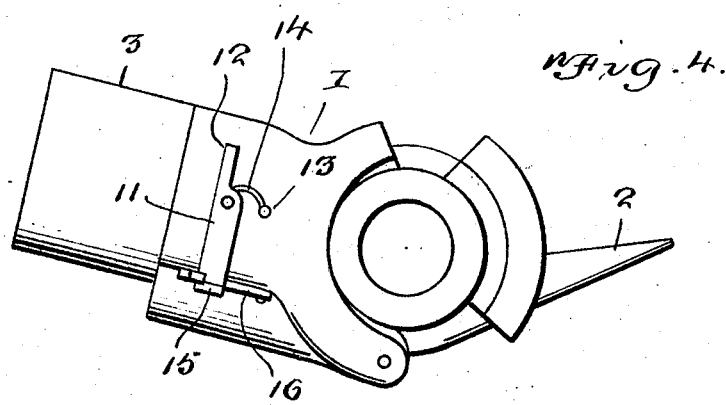
Figure 4 is a side elevation of one of the coupling heads.
Figure 5:
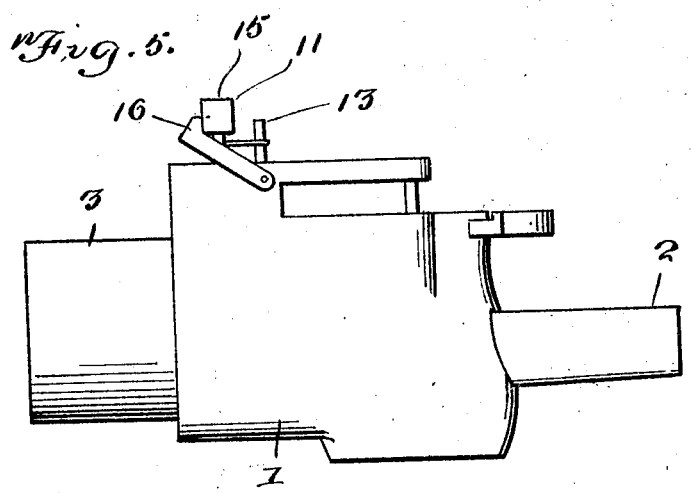
Figure 5 is a top plan view thereof.
Figure 6:
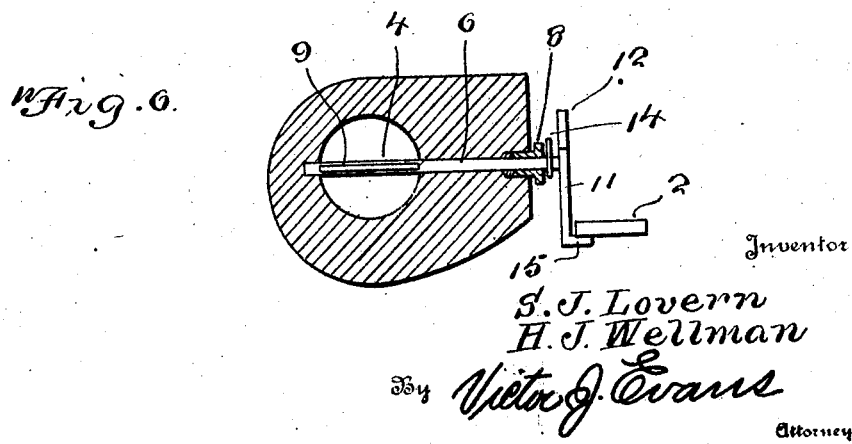
Figure 6 is a sectional view on the line 6—6 of Figure 3.

The coupling heads illustrated by the drawings are of the construction usually employed in coupling the ends of air hose in air brake systems for rolling stock, and therefore a detailed description of the same will not be attempted. The coupling heads 1 are each of a similar construction, so that reference made to parts of one may be taken as equally applicable to the other. The coupling heads are associated in the usual manner, each of the said heads being provided with an outwardly extending angularly disposed horn 2, and the horn of one head is designed to overlie that of the other when the coupling heads are associated.

Each of the heads is provided with the usual tubular inner extension 3 to which the hose line is connected, and each of the heads, in a line with the bore of the said extension 3 has arranged therein a valve 4. Each of the valves is round in plan, corresponding to the shape of the bore in the longitudinal air passage of the heads. Each valve is provided with a stem 6, the lower portion of the stem finding a bearing in the coupler head, and the outer portion thereof projecting through a suitable opening in the top of the head. This portion of the valve stem passes through a suitable packing box 8 to prevent the bleeding of air through the opening provided for said stem. Each of the stems is formed, adjacent to its inner or lower end with a slot 9 of a length equalling the central diameter of the valve, and through this slot the valve is passed. Suitable securing means holds the valve in the slot of the stem.

Secured to the outer end of each of the stems 6 there is a handle or lever 11. Each of the levers 11 preferably has one of its ends reduced or formed with a finger extension 12 that is in the path of contact with an upstanding lug 13 on the coupling head, and which limits the swinging of the lever in one direction, when the valve is in closed position. The lever is influenced in this direction through the medium of a spring 14 that is preferably secured to the under face of the lever, coiled around the stem 6 and secured to the stop lug 13. The outer end of the lever or that opposite the end provided with the finger 12 is formed with a flange providing a head 15, and this headed end of the lever is designed to be engaged by a catch 16 which is pivotally supported on one side of the head when the lever is to be held in a position to retain the valve open. The catch is only employed when a coupling head provided with the improvement is employed in connection with an ordinary coupling head.

In practice, the coupling heads are brought together and coupled in the usual manner. The movement of the horns over the respective heads of the couplings will bring the said horns into contact with the heads of the levers to swing the same to open the valves. When the draw heads are pulled away from each other, the couplings will become disassociated, and the horns passing off of the levers will permit the quick closing of the valves to prevent the brakes going on in emergency and thereby obviate the shock and jar common in such occurrences. To insure this, the valves are preferably provided with small bleed ports 17. This is also true when the couplings are disassociated, and it is thought that the foregoing description, when taken in connection with the drawings, will fully set forth the construction and its advantages to those skilled in the art to which such inventions relate.

Having described the invention, we claim:—

An air pipe coupling for the purpose set forth, comprising two coupling heads designed for coengagement to establish an air passage therethrough, each of said heads having an outwardly projecting angularly disposed horn designed to be arranged over the top of the cooperating head, a disc valve in the air passage of each of the coupling heads, each of said valves having a bleed opening therethrough, a stem for each valve, a lever on each stem, each of said levers having a reduced extension providing a finger on one end and an upturned flange providing a head on its opposite end, a stop element on each of the coupling heads in the path of engagement with the fingers of the respective levers, spring means influencing the levers to one position for holding the valves closed, a catch element on each of the coupling heads engageable with the headed ends of the levers, when the latter are swung to open the valves, and the headed end of each lever being in the path of contacting engagement with the horn of the cooperating coupling heads and designed by virtue of such contact to be swung to open the valves, and the horns being of such length as to permit of the slow closing of the valves when the coupling heads are disassociated.

In testimony whereof we affix our signatures.

SAMUEL J. LOVERN.
HENRY J. WELLMAN.